United States Patent
Cheung

(10) Patent No.: US 7,063,769 B2
(45) Date of Patent: Jun. 20, 2006

(54) CONSTRUCTION OF GLIDING BOARD AND METHOD OF PRODUCTION

(75) Inventor: Kwong Kee Cheung, Kowloon (HK)

(73) Assignee: Metropole Development Limited, Shatin (HK)

( * ) Notice: Subject to any disclaimer, the term of this patent is extended or adjusted under 35 U.S.C. 154(b) by 1 day.

(21) Appl. No.: 10/853,103

(22) Filed: May 26, 2004

(65) Prior Publication Data

US 2005/0276966 A1    Dec. 15, 2005

(51) Int. Cl.
*B29C 65/00* (2006.01)

(52) U.S. Cl. .................. 156/309.6; 441/65; 441/74
(58) Field of Classification Search ............... 441/65, 441/74
See application file for complete search history.

(56) References Cited

U.S. PATENT DOCUMENTS

| 5,211,593 A | 5/1993 | Schneider et al. |
| 5,658,179 A | 8/1997 | Glydon et al. |
| 2003/0224675 A1 | 12/2003 | Yeh |
| 2005/0170719 A1* | 8/2005 | Lin .............................. 441/74 |
| 2005/0202737 A1* | 9/2005 | Cheung ....................... 441/65 |

* cited by examiner

*Primary Examiner*—Jeff H. Aftergut
*Assistant Examiner*—John L. Goff
(74) *Attorney, Agent, or Firm*—Jacobson Holman PLLC

(57) ABSTRACT

A gilding board for sliding on water, snow and land, is constructed from polyethylene foam material, in three-ply or more layers of constant density or different densities as a multi-layer board core. The three-ply board core enhances the crash-worthiness from water surfing, snow or land gliding, with a provision of better comfort and a function of high security for users by having smooth surfaces of the board on both sides.

6 Claims, 2 Drawing Sheets

CONSTRUCTION OF GLIDING BOARD AND METHOD OF PRODUCTION

FIELD OF THE INVENTION

This invention is related to gliding boards, particularly all kinds of gliding devices for sporting and leisure purposes. The devices can be identified as surfboards, bodyboards, wakeboards, swimboards, kickboards, snow sleds, skimboards, grass-gliders, sand-gliders, etc. The unique production methods and multi-layers of board core of the present invention give the advantages of simplification of the manufacturing process, minimize the consumption of resources and material in production, reduce manufacturing cost, provide a better architecture of the board itself together with enhancing its integrity of the board core for providing better safety and comfort performance for end-users.

BACKGROUND OF THE INVENTION

Generally, a gliding board is applied as a surfing board on waters which is formed by a single layer of polymer foam material with opened cell and low density or double layers with different densities, laminated together for performance of an inner board core, in which the board itself wrapped by crosslinked or non-crosslinked polyethylene by heat lamination, in between an outer board core of single layer of high density, closed-cell foam material preformed as an essential media layer to bond to both sides of a board core by heat lamination, to form the surf board.

Similar to surfing boards, another type of sports board which is normally used as a snow slider, is usually composed of a dual-layer with low density, polymer foam material as a board core and essentially having a higher density, closed-cell foam material as a media layer for better bonding, by heat laminating between the top and bottom sides of a board core and top and bottom skin of the boards. Normally, the boards have a hand rail apparatus and are shaped as an upward curve for speed acceleration.

Typically the bond of plastic graphic film, in general having a thickness between 1 mil to 5 mils, with one or more layers of plastic polymer film for covering the graphic artwork inside, should be laminated to no less than one layer of media backing foam or backing sheet, with a thickness around 2 mils to 6 mils, and with a higher density of around 6 pounds PCI, for adherence to the polyethylene foam board core of sports boards by heat lamination and to protect the graphic imprint, which augments the complexity and difficulty of the production process large amounts of resources expended and having a high cost and low effectiveness.

The impulsion of a cleave lamination between a plastic protective board and a board core was a mezzanine plastic backing foam layer with higher density. Normally this layer was in the range of 2 mils to 6 mils in thickness and 6 pounds PCI in density. Due to the resistance of polyethylene foam material involving limitations of bonding methods, such sport boards were usually made by this method.

SUMMARY OF THE INVENTION

The concern of the present invention with respect to gliding boards is the architecture of the three-ply board core which omitted two layers of the outer core. The structure of the polyethylene board core is configured by four different ways of combining triplex polyethylene foam material. First, the three-ply board core is configured by three layers of a same density and thickness, preferably in a range of 3 to 6 pounds PCI with a thickness between 2 mils and 18 mils, or at the same density with different thickness. Further, it is applicable by adopting a different density with the same thickness or a different thickness, preferably the top two layers of the board core would have the same higher density than the bottom layer. The density of both of the top two layers will be in a range of 3 to 6 pounds PCI with a thickness at around 2 mils to 15 mils, as compared with the bottom layer of the board core, which has a lower density in a range of 1 to 4 pounds PCI with a thickness around 10 mils to 20 mils.

The remarkable improvement over existing generic sports boards was the structure of the polyethylene board core enabled for directly mechanically agglutinating, without the aid of an outer core of a backing foam or a backing sheet, to the top plastic polymer graphic film and the bottom plastic polymer protective board. By applying this methodology, both of two layers of backing foam or backing sheet on both ends of the board core will be omitted and result in a cost saving on resources consumption and production cost would be minimized, and be more environmentally-friendly.

The improved methodology of bonding the plastic polymer graphic film to the polyethylene board core was made by using a layer of compound thermoplastic, a newly refined material to supersede traditional bonding methods of heat lamination. The compound thermoplastic consists of low density polyethylene, tackifying resin and ethylene vinyl acetate copolymer, to be heated to a high temperature of 180 to 200 degrees, thereafter, to be mechanically injected on the surface of the first layer of polyethylene board core. Generally, the thickness of the thin plastic polymer graphic film is under the range of 0.01 mil to 0.5 mil and the side with reverse graphic artwork imprinted will be adhesively cleaving, by the compound thermoplastic substance, approximately 0.1 to 0.8 mil in thickness, to the side of the board core. Furthermore, the surface with a graphic imprinted will be well protected against friction from extrinsic impacts. The air-cell from the board core is filled up by the compound thermoplastic substance thereby the integration of the plastic polymer graphic film with the polyethylene board core will be adhesively agglutinated. To ensure a better performance of tenacity of both of the layers, a pair or rollers will be applied during the injection mode in between the surface of the polyethylene board core and the plastic polymer graphic film, in which a top roller consists of a pattern on its surface and a plain roller at a bottom will press the graphic film to the board core for a better interlock for the prevention of the graphic film to be torn from the board core, and with the provision of a greater smooth graphic skin on the gilding boards.

The other invention for the gliding boards is the production process for the adhesion of a plastic polymer protective board to a polyethylene board core. Traditionally, from prior generic bonding methods of the protective board to the board core, there would be a media layer, a mezzanine closed-cell, high density layer of polyethylene backing foam or backing sheet, which thickness was approximately 2 mils to 6 mils, which would be adhered by a heat lamination method to the board core for further easier bonding with the protective board.

The present invention omits the function of the mezzanine polyethylene backing foam as media, so as to directly agglutinate the board core with the plastic polymer protective board by adopting a new methodology of a dual-layer of thermoplastic polymer substance as the way for replacement of heat lamination of the board core with backing foam to the plastic protective board. It is a new invented method that separately applies two heatings by high temperature around 180 to 200 degrees to melt the polymer substance. These two adhesive elements are either low density polyethylene or high density polyethylene. These two layers of thermoplastic polymer substance will be injected simultaneously at the same speed, on one side of the third board core. The thickness of the first layer of polymer substance will be in the range of 0.1 mil to 0.5 mil and the second layer will be in the range of 2 mils to 5 mils. The function of the first layer is to fill in the air cells on the surface of the polyethylene board core by the polymer substance to enhance the stiffness of the board core. Thereafter, the second layer of polymer substance is to agglutinate the board core with a plastic polymer protective board, in which the thickness is around 0.2 mil to 0.8 mil, to perform a better bonding for the gliding boards. This method is to viscose the board core with a plastic polymer protective board in a better condition that will not easily tear from friction, and bonding without the aid of backing foam or a backing sheet, but to be directly agglutinated, not by generic hot lamination, as a result of which less production processing will be required, a cost saving in resources consumption achieved and be eco-friendly to the earth.

Another invention concerning the polyethylene board core is applying three layers of polyethylene foam as the core of the gliding board. This improved core design provides a better functioning of the board core as a cushion itself, to alleviate the impacts and hurtles from gliding and to perform a better protection for users.

Generally, from prior art boards, the structure of the boards were made of one layer or two layers of polyethylene foam, with a low density, approximately at two pounds PCI with 10 mils to 15 mils foam board as the board's inner core. Thereafter the board was laminated with one layer of a closed-cell, but high density, polyethylene foam sheet, approximately six pounds PCI with 2 mils to 6 mils thickness, by a heat lamination method to bond the outer core on both sides of the inner core so as to form an outer core for the function of protection of the inner core. Further heat lamination was performed with a plastic polymer protective board and a plastic polymer skin at the top. However, the one or two layers of inner board core was not effective for alleviation of shock from water and snow while gliding.

Therefore, the present invention is to enhance the structure of the board core with three layers, in which the first two layers will have the same higher density than the bottom layers, to intensify the cushioning function of the polyethylene foam core. Normally the density will be around 3 to 6 pounds PCI with 2 mils to 15 mils in thickness. The bottom layer is to alleviate the shock of friction while gliding on land, water or snow and to support the pressure applied from users when lying or sitting on the top of the board during gliding. Normally this layer of foam core will be of a low density but a same thickness as a second layer of the board core, approximately 1 to 4 pounds PCI with a thickness at around 10 mils to 20 mils.

DETAILED DESCRIPTION OF THE PREFERRED EMBODIMENTS

Figure 1:
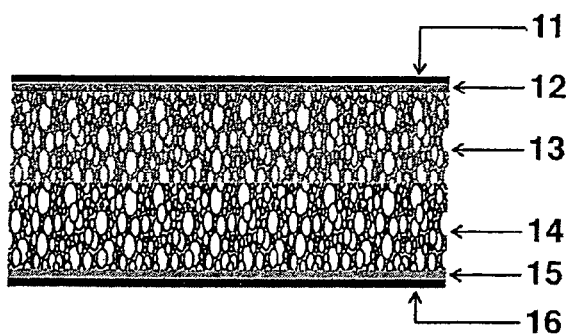
FIG. 1 is a cross-sectional view of a prior art sports board structure.

FIG. 1 shows a structure of a prior art sports board. The inner board core is formed by heat lamination of layers 13 and 14 formed of a low density, closed-cell polyethylene foam material. The outer core of backing foam board sheet 12, with a higher density and closed-cell foam is heat laminated to layer 13. Further heat lamination is applied to the surface 11 of a plastic polymer graphic film, a layer of backing foam sheet 15, and a media laminate 16, to form the plastic polymer protective board.

Figure 2:
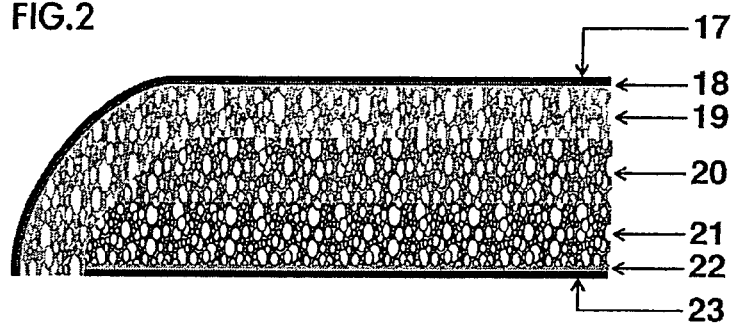
FIG. 2 is a cross-sectional view of a gliding board structure of the present invention with the same density of the first two layers of the board core.

FIG. 2 shows a cross-sectional view of the structure of the invention in which three layers of polyethylene board core are of a same thickness or of a same density. Adopting the compound thermoplastic substance 18 for agglutination with the plastic polymer graphic film 17 to first layer board core 19 with high density, closed-cell polyethylene foam material. Thereafter a dual-layer of thermoplastic polymer substance 22 is agglutinated with the plastic polymer protective board 23 to third layer of polyethylene board core 21, a low density closed-cell polyethylene foam material. A heat lamination method is used for bonding a same density, closed-celled polyethylene foam material 20 as first layer 19 to third layer 21, pre-shaped thereafter by heat lamination with first layer 19, the plastic polymer graphic film 17 extending from the top portion to the plastic protective board at the bottom to form the gliding board.

Figure 3:
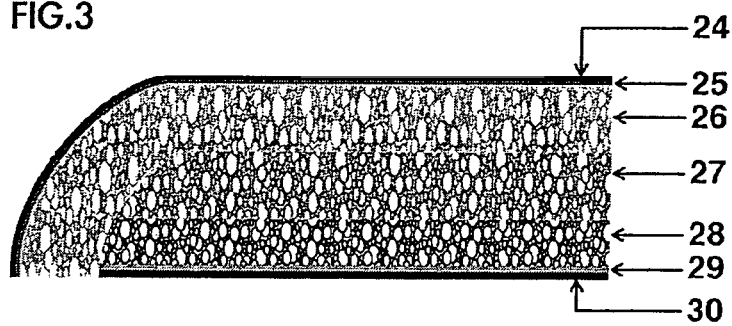
FIG. 3 is a cross-sectional view of a gliding board structure of the present invention with a different density for the first two layers of the board core.

FIG. 3 shows a similar cross-sectional view of the structure of the invention as shown in FIG. 2, but in which three layers of polyethylene board core are of different thicknesses or density. Adopting the compound thermoplastic substance 25 for agglutination with the plastic polymer graphic film 24 to first layer board core 26 of high density, closed-cell polyethylene foam material. Thereafter, a dual-layer of thermoplastic polymer substance 29 is agglutinated with the plastic polymer protective board 30 to third layer of polyethylene board core 28, of a low density, closed-cell polyethylene foam material. A heat lamination method is used for bonding a same density, closed-celled polyethylene foam material 27 as first layer 26 to third layer 28, pre-shaped thereafter by heat laminating with first layer 26, the plastic polymer graphic film 24 extending from the top portion to the plastic protective board at the bottom to form the gliding board.

Figure 4:
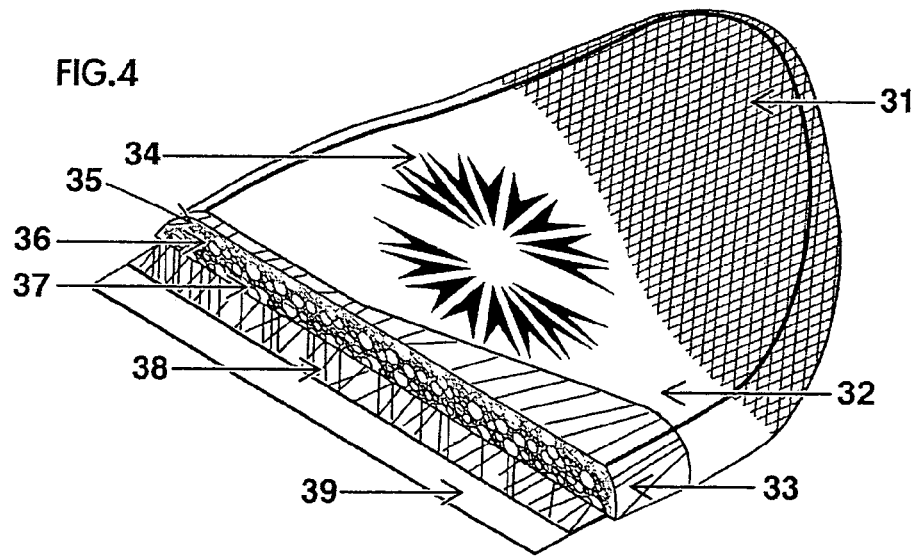
FIG. 4 is a perspective view of an embodiment of the gliding board of the present invention.

FIG. 4 shows a perspective view of an embodiment of the present invention of a gliding board consisting of a plastic polymer graphic film 32 at the top with a graphic imprint 34 and pattern on the surface 31, by agglutination of compound thermoplastic substance 33 to the first layer of polyethylene board core 35 and by heat lamination to the second layer of polyethylene board core 36 and third layer of polyethylene board core 37. A dual-layer of thermoplastic polymer substance 38 is used for cleave agglutinate with the plastic polymer protective board 39. Finally, the top plastic polymer graphic film extending from the top portion to the plastic protective board at the bottom forms the gliding board.

Figure 5:
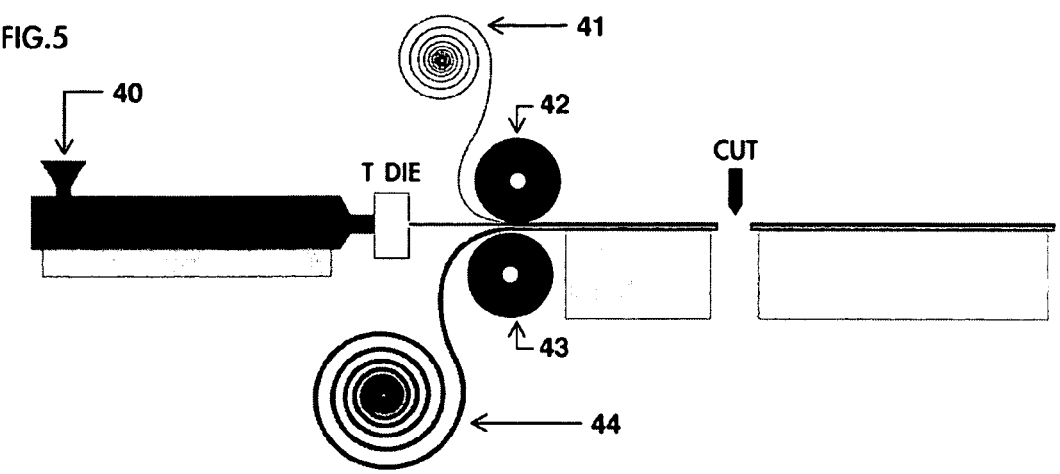
FIG. 5 is a partially schematic view of the new methodology of a bonding of plastic polymer graphic film to a polyethylene board core of the invention.

FIG. 5 shows a schematic view of the new methodology of bonding of plastic polymer graphic film to polyethylene board core of the invention. By shoving the compound thermoplastic substance which contains low density polyethylene, tackifying resin and ethylene vinyl acetate copolymer in the furnace 40 with a high temperature of 180 to 200 degrees, and thereafter passing through a T-die for injection, a layer of compound thermoplastic substance is placed in between plastic graphic film 41 and first layer of polyethylene board core 44 which are both in roll format to be bonded and pressurized by upper pattern roller 42 and a lower plain roller 43 for reinforcement of the stiffness of the graphic film to the board core.

Figure 6:
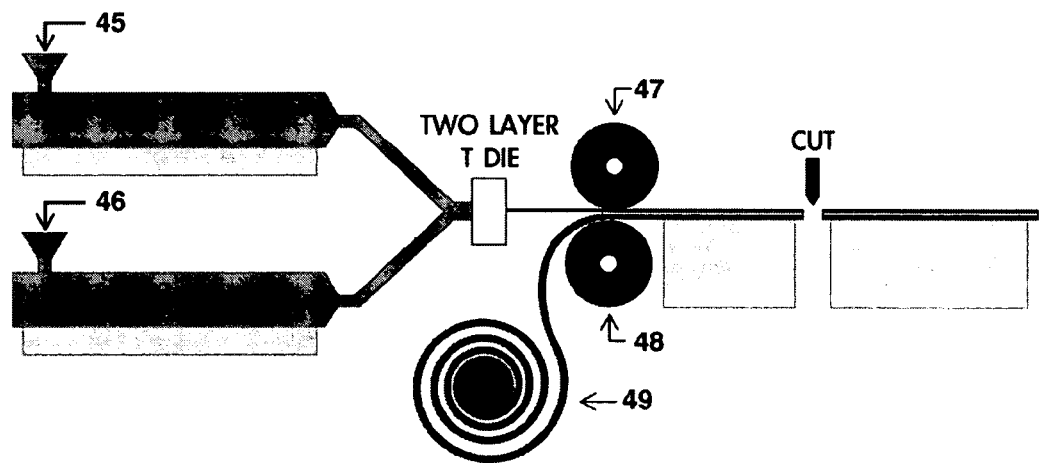
FIG. 6 is a partially schematic view of the new methodology of viscose of a polyethylene board core of the invention.

FIG. 6 shows a schematic view of the new methodology of viscose of the polyethylene board core of the invention. By shoving either low density polyethylene or high density polyethylene into both furnaces 45 and 46 with a high temperature of 180 to 200 degrees, and thereafter passing through a T-die for injection, a dual-layer of thermoplastic substance is placed on the surface of third layer of polyethylene board core 49 which is exported from a roll format and to be bonded and pressurized by the upper roller 47 and a lower roller 48 for reinforcement of the stiffness of the board core for replacement of the backing foam sheet laminated to the board core for further heat lamination of the plastic polymer protective board.

Figure 7:
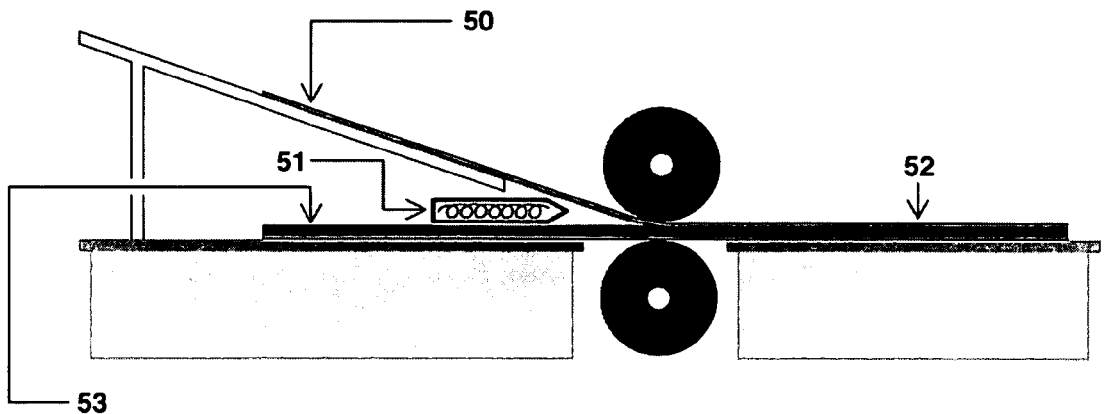
FIG. 7 is a partially schematic view of the method of manufacturing of a gliding board of the invention.

FIG. 7 is a schematic view of the method of manufacturing a gliding board of the invention. By applying a heat lamination method through the febrifacient 51 and pushing through the pair of roller for pressurizing, to bond either the plastic polymer protective board 50 and the third layer of polyethylene board core 53, or the second layer of polyethylene board core 50 to the third layer of polyethylene board core 53 with a plastic polymer protective board, or the first layer of polyethylene board core 50 bonded with a plastic polymer graphic film to the pre-shaped second plus third polyethylene board core 53 bonded with a plastic polymer protective board. Thereafter, behind the rollers, the materials are pressed to have a curved shape at the front of the board, and the semi-product of the gliding board 52 will be processed afterwards by further heat lamination to extend the graphic film from top to the bottom of plastic polymer protective board to form the gliding board.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents, including the composition by means of the number of layers, the densities of the materials and the thickness of each layer, may be resorted to, falling within the scope of the invention.

I claim:

1. A method of producing a gliding board, said method comprising:
   (A) agglutinating a first layer of a three-ply closed-cell, high density polyethylene board core with a layer of plastic polymer graphic film by a compound thermoplastic substance under the temperature of 180 to 200 degrees;
   (B) applying a two-layer thermoplastic substance to a third layer of the three-ply board core with a thickness of a top layer of the two-layer thermoplastic substance is in the range of 2 mils to 5 mils whilst a bottom layer of the two-layer thermoplastic substance is in a range of 0.1 mil to 0.5 mil;
   (C) applying heat to adhere a second layer and the third layer of the three-ply polyethylene board core;
   (D) applying heat to adhere the second and the third layer of the three-ply polyethylene board core to the first layer of the three-ply board core to form a semi-product of the gliding board;
   (E) applying heat and pressure to extend the plastic polymer graphic film from the first layer of the three-ply polyethylene board core to attach to a bottom plastic polymer protective board secured to the third layer of the three-ply board core to form the gliding board.

2. The method as claimed in claim 1, wherein a thickness of the plastic polymer graphic film is approximately 0.01 mil to 0.5 mil.

3. The method as claimed in claim 1, wherein a thickness of the first and the second layers of the three-ply polyethylene board core is approximately 2 mils to 15 mils.

4. The method as claimed in claim 1, wherein a thickness of the third layer of the three-ply polyethylene board core is approximately 10 mils to 20 mils.

5. The method as claimed in claim 1, wherein a thickness of the plastic polymer protective board is approximately 0.2 mils to 0.8 mils.

6. The method as claimed in claim 1, wherein a thickness of the compound thermoplastic substance, which consists of low density polyethylene, tackifying resin and ethylene vinyl acetate copolymer, is approximately 0.1 to 0.8 mils.

\* \* \* \* \*

UNITED STATES PATENT AND TRADEMARK OFFICE
CERTIFICATE OF CORRECTION

| | | |
|---|---|---|
| PATENT NO. | : 7,063,769 B2 | |
| APPLICATION NO. | : 10/853103 | |
| DATED | : June 20, 2006 | |
| INVENTOR(S) | : Cheung | |

It is certified that error appears in the above-identified patent and that said Letters Patent is hereby corrected as shown below:

Column 1, line 41, please change "mil" to --mm-- and please change "mils" to --mm--;

Column 1, line 45, please change "mils" (both occurrences) to --mm--;

Column 1, line 54, please change "mils" (both occurrences) to --mm--;

Column 2, line 1, please change "mils" (both occurrences) to --mm--;

Column 2, line 8, please change "mils" (both occurrences) to --mm--;

Column 2, line 10, please change "mils" to --mm--;

Column 2, line 11, please change "mils" to --mm--;

Column 2, line 32, please change "mil" (both occurrences) to --mm--;

Column 2, line 35, please change "mil" to --mm--; and

Column 2, line 57, please change "mils" to --mm--.

Column 2, line 58, please change "mils" to --mm--;

Column 3, line 8, please change "mil" (both occurrences) to --mm--;

Column 3, line 9, please change "mils" (both occurrences) to --mm--;

Column 3, line 15, please change "mil" (both occurrences) to --mm--;

Column 3, line 33, please change "mils" (both occurrences) to --mm--;

Column 3, line 36, please change "mils" (both occurrences) to --mm--;

Column 3, line 49, please change "mils" (both occurrences) to --mm--;

Column 3, line 56, please change "mils" (both occurrences) to --mm--;

Column 6, line 17, please change "mils" (both occurrences) to --mm--; and

Column 6, line 19, please change "mil" (both occurrences) to --mm--.

Column 6, line 33, please change "mil" to --mm--;

UNITED STATES PATENT AND TRADEMARK OFFICE
CERTIFICATE OF CORRECTION

PATENT NO. : 7,063,769 B2
APPLICATION NO. : 10/853103
DATED : June 20, 2006
INVENTOR(S) : Cheung It is certified that error appears in the above-identified patent and that said Letters Patent is hereby corrected as shown below:

Column 6, line 34, please change "mil" to --mm--;

Column 6, line 37, please change "mils" (both occurrences) to --mm--;

Column 6, line 40, please change "mils" (both occurrences) to --mm--;

Column 6, line 43, please change "mils" (both occurrences) to --mm--; and

Column 6, line 47, please change "mils" to --mm--.

Signed and Sealed this

Twenty-ninth Day of May, 2007

JON W. DUDAS
*Director of the United States Patent and Trademark Office*